May 6, 1969
W. H. CUDD ET AL
3,442,313
PITTER AND SORTER FOR SEPARATING PITTED
FROM UNPITTED PEACH HALVES
Filed Jan. 16, 1967
Sheet _1_ of 2
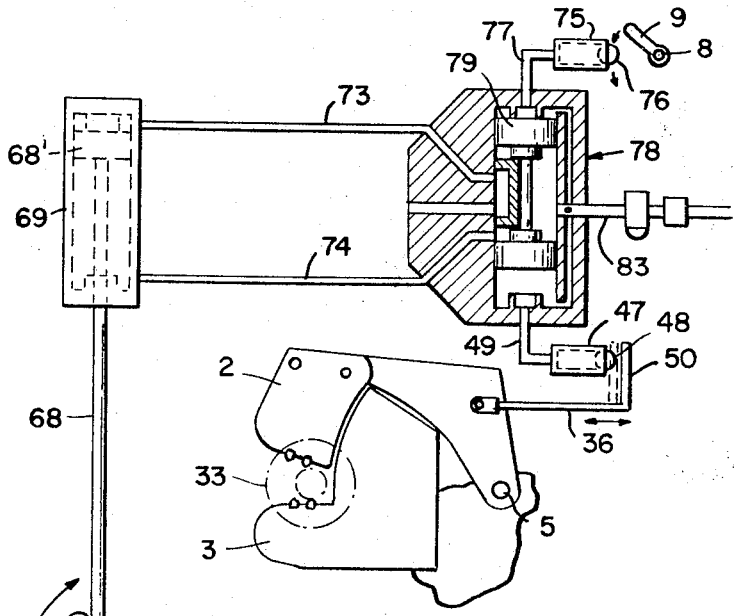
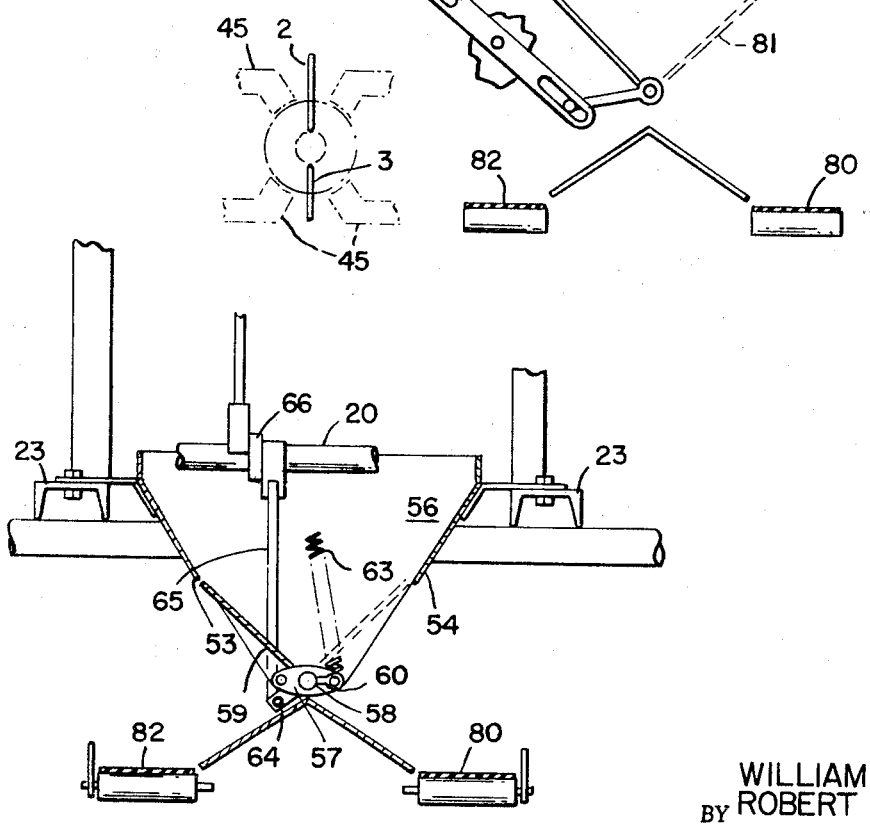
INVENTORS
WILLIAM H. CUDD
BY ROBERT A. SOULIER
Boyken, Mohler, Foster & Schlemmer
ATTORNEYS

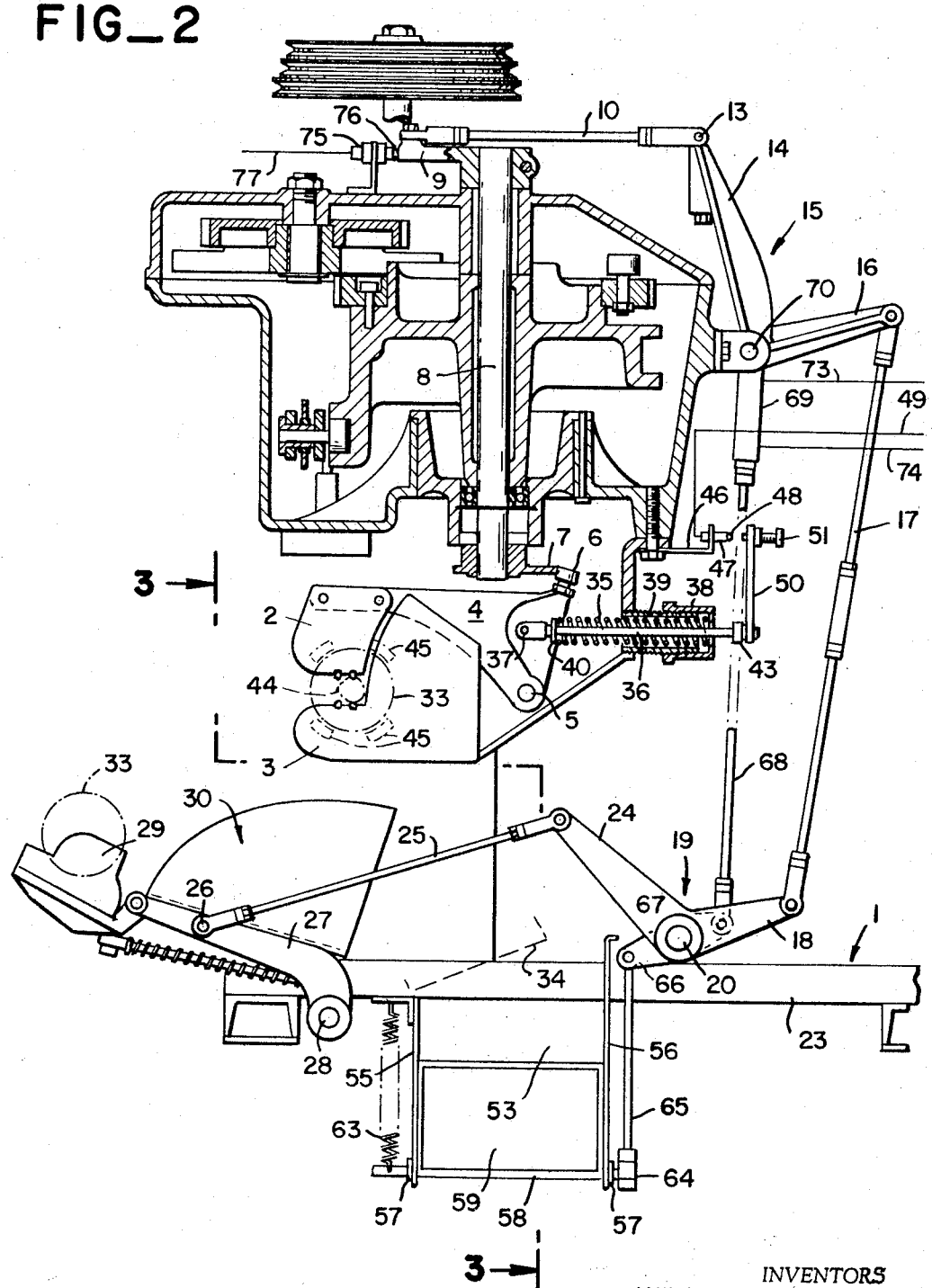

United States Patent Office 3,442,313
Patented May 6, 1969

3,442,313
PITTER AND SORTER FOR SEPARATING PITTED FROM UNPITTED PEACH HALVES
William H. Cudd, Dixon, and Robert A. Soulier, Davis, Calif., assignors to Filper Corporation, San Ramon, Calif., a corporation of California
Filed Jan. 16, 1967, Ser. No. 609,675
Int. Cl. A23n 3/00; A47j 25/00
U.S. Cl. 146—222                                      8 Claims

ABSTRACT OF THE DISCLOSURE

A sorter actuatable for separating clingstone peach halves having split pit halves attached thereto from halves pitted by a torque type pitter, in which actuation of the sorter is effected by movement of pit gripping and fruit bisecting blade through the halves of a split pit, instead of gripping the pit.

Background of invention

In a torque type peach pitter the pit within each clingstone peach is gripped and held between coplanar blades that also biset the body of the peach about each pit substantially in the plane of the suture of the peach. The peach halves and pit are then preferably simultaneously moved relative to each other about an axis substantially perpendicular to said plane, whereby both halves are simultaneously separated from the pit.

Where the pit in a clingstone peach is split the pit may not be gripped since the split is normally in the plane of the suture and one of the pit gripping and bisecting blades will continue to move through the pit in the plane of the split, leaving a split pit half in the bisected halves.

In U.S. Letters Patent 2,826,227 of Mar. 11, 1958, a torque pitter of the above type is disclosed, but no provision was made for separating the bisected peach halves having split pit halves therein, from the pitted peach halves, which necessitated separating the pitted from the unpitted halves at a point beyond the location where the initial bisecting of the peaches occurred. This problem has been solved by the present invention.

Summary

By the present invention, immediately upon movement of the peach bisecting and pit gripping blades between the halves of a split pit, and before the halves actually fall from the blades, a guide or separator element below point of bisection of the peach is actuated, in response to movement of the peach bisecting and pit gripping blades between the halves of a split pit, or the equivalent movement, for guiding the unpitted for improperly cut peach halves along a path different from the path of the pitted halves, thus separating properly pitted peaches from unpitted peach halves and eliminating the successive pitting and handling of peach halves at a point or points beyond a single bisecting and pitting station.

Brief description of the drawings

FIG. 1 is a semi-schematic view of the separate elements for bisecting and gripping the pit of a peach and for separating the unpitted halves from the pitted halves including the system for actuating the sorter.

FIG. 2 is a part sectional, part elevational view of the invention applied to a machine as disclosed in the patent hereinbefore mentioned, certain parts of the said machine being omitted for clarity.

FIG. 3 is a fragmentary part sectional, part elevational view as seen from line 3—3 of FIG. 2 with parts not essential to the operation of the invention omitted, insofar as the structure of the guide means for guiding pitted and unpitted halves to one path or another is concerned, and the dot-dash lines indicate generally the position of the peach grippers for twisting the fruit halves, said grippers being shown and described in detail in the patent hereinabove mentioned.

Description of the preferred embodiment

In the conventional pitter shown in FIG. 2 and as disclosed in U.S. Letters Patent No. 2,826,227, issued Mar. 11, 1958 to J. Perrelli et al., a frame, generally designated 1 carries an upper peach bisecting and pit engaging blade 2 and a lower blade 3, said blades being in the same vertical plane. The upper blade 2 includes an arm 4 projecting therefrom, and a pivot 5 supports the arm at its end remote from the blade 2 for generally vertical oscillatory movement of said blade toward and away from the lower blade 3. This movement of the blade is effected through the engagement of a cam follower 6 on said arm with a cam 7 secured on the lower end of a vertically disposed shaft 8 that, in turn, is adapted to be rotated in one direction through a driving connection with a motor (not shown).

Secured to the upper end of shaft 8 is one end of a horizontally disposed arm 9 that, in turn, is connected by a pivot at its opposite outer end with one end of a horizontally extending link 10. The opposite end of link 10 is pivotally connected at 13 with arm 14 of a vertically disposed crank 15, and the other arm 16 of the crank is pivotally connected with one end of a vertically extending rod 17.

The lower end of rod 17 is pivotally connected with the outer end of one arm 18 of a crank 19 that is on a shaft 20, the latter being rotatably supported in a bearing secured to a lower horizontal frame member 23.

The other arm 24 of crank 19 is pivotally connected at its outer end with one end of a link 25, the opposite end of which link is pivotally connected at 26 with one of the arms 27 of a corresponding opposed horizontally extending pair thereof, and which pair of arms, in turn, are supported at one of their ends on a shaft 28, that in turn in supported on a stationary part of frame 1 for oscillatory and simultaneous swinging of the opposite ends of said arms upwardly and back again upon reciprocation of link 25 under oscillatory movement of crank 19.

The said opposite ends of arms 27 are connected and carry a fruit or peach holder 29 for supporting a peach to be halved and pitted, with the suture of the latter in the same plane as that in which blades 2, 3 are positioned.

A generally U-shaped upwardly opening fruit and pit receiver 30 is also carried by arms 27 in a position below the pair of bisecting and pit engaging blades 2, 3. Thus, when a peach, such as indicated at 33 is delivered by holder 29 to a position between blades 2, 3 (FIG. 3) and said peach is bisected and pitted, or bisected and not pitted in the case of a split pit, the halves and pit or the halves with the split pit halves still therein, will be dropped from the blades 2, 3 onto the bottom of the receiver 30, which is generally horizontal at this time.

Upon upward movement of arms 27 about the axis of shaft 28 to deliver a peach to blades 2, 3, the receiver 30 onto which the previously bisected fruit has been dropped, will be titlted to the dot-dash line position 34 to discharge the halves and pit, as will later be explained.

The cam follower 6 on the arm 4 that carries upper blade 2, is yieldably held against cam 7 by means of a helical expansion spring 35. A rod 36 extends through spring 35 and one end of said rod is pivotally connected by a pivot 37 with arm 4, while the other end of said rod 36 slidably extends through a cap 38 that, in turn, is threaded onto a sleeve 39 carried by a stationary part of frame 1. Spring 35 extends into sleeve 39 and reacts between the head of cap 38 and a collar 40 on rod 36 adjacent to arm 4, and the opposite end of rod 36 projects through and outwardly of cap 38.

The end of rod 36 that projects outwardly of cap 38 at the side of the latter opposite to spring 35, carries an adjustable stop 43 for limiting the movement of blade 2 toward blade 1 when the rod is moved toward said blade under the control of cam 7, should the blade 2 pass through a split pit.

At this point it should be remarked that it is this movement of blade 2 through a split pit to a position relatively close to blade 1, and the resultant movement of rod 36, that is relied upon to actuate the means for separating peach halves having split pits therein from pitted peach halves, hence, actuation of the separating or sorting means is positive and exact as to timing, and occurs at the point where the peach is bisected.

Whether or not the pit is split or is sound, a set of peach grippers 45 (FIGS. 2, 3) will simultaneously move into gripping engagement with the peach halves at opposite sides of the blades 1, 2 for twisting said halves about an axis perpendicular to the plane of blades 1, 2, or to the plane of the suture of the peach bisected by the blades. These grippers rotate about the aforesaid axis, and then move away from the peach halves so that the latter will drop onto the bottom of the receiver 30. If the peach is pitted, as occurs where the pit is sound, the halves and the pit drop onto the bottom of the chute, and if the pit was split and the pit halves remain in the peach halves, the latter with the pit halves therein, will be dropped onto the bottom of the receiver 30, or chute.

Up to this point the structure and operations that have been described, have been disclosed in the hereinbefore mentioned patent and the following description relates the improvements to the parts hereinabove described.

Positioned above the cap 38 and sleeve 39 (FIG. 2) is a bracket arm 46 that is rigidly connected with part of frame 1. This arm extends horizontally outwardly of the frame 1 to a position above said sleeve 39 and carries a horizontally disposed sensor 47 at its outer end. Sensor 47 may be, and is shown as a tubular relief valve having a projecting ball seal 48 at its outer end releasably sealing the outer end of said sensor against leakage of air therein from said outer end, and a compressed air line 49 connects with the opposite end of the tubular sensor. Upon moving the ball inwardly into the tube the air pressure within the sensor is released.

The projecting outer end of the rod 36 that is connected with blade 2 carries an upstanding finger 50 through the upper end of which threadedly extends a horigontally disposed screw 51. This screw projects at its outer end toward and in alignment with ball 48, and is adjustable on finger 50 different distances from ball 48. It may also be noted that finger 50 is adjustably secured on the outer end of rod 36. The spacing between the outer end of screw 51 or the end facing ball 48, and ball 48 is such that, upon movement of rod 36 in a peach bisecting operation, the screw 51 will engage and open the ball 48 when the blade 2 moves through a split pit, but the ball will not be upset where the blade 2 meets a sound pit. Thus the sensor 47 will be actuated only when the blade 2 encounters a split pit, or if no peach is at the pitting position on blades 2, 3, or even where a peach may be improperly bisected so that the blade 2 moves its maximum distance toward blade 3 without gripping a pit, in which latter instance, of course, the pit will remain in at least one half of a peach.

Frame members 23 may be approximately equally spaced from opposite sides of the vertical plane in which blades 2, 3 are disposed (FIG. 3), and a pair of stationary, horizontally spaced, generally opposed plates or walls 53, 54 extend convergently downwardly from said frame members 23 and are supported by the latter. The lower edges of plates 53 are spaced apart a substantial distance, and a pair of spaced, opposed, vertically disposed end plates 55, 56 close the ends of the space between the plates 53, 54 substantially from their lower to their upper ends except that end plate 56 projects substantially higher than plate 55 and said end plates extend downwardly a substantial distance below the lower edges of said plates 53, 54 for supporting bearing 57 at their lower ends for the ends of a horizontal shaft 58. Shaft 58 is supported by said bearings in a vertical plane substantially bisecting the space between the lower edges of plates 53, 54.

A deflector or guide plate 59 is secured along its lower edge to shaft 58 and extends upwardly from said shaft so as to generally constitute an inclined downward extension of one or the other of said plates 53, 54 according to whether shaft 58 is rotated to bring the upper edge of the deflector adjacent to one plate 53 or to swing the plate 59 so its upper edge is adjacent to the other plate 54.

A radially outwardly projecting arm 60 is connected with one end of shaft 58 and a helical spring 63 is connected at one end with said arm and at the other end with a stationary part of frame 1 to yieldably hold the shaft 58 in the full line position of FIG. 2 in which the deflector plate 59 is in substantially downward continuation of the wall 53.

Secured on the end of shaft 58, opposite to spring 63, is a radially outwardly projecting arm 64, the outer end of which is pivotally connected with the lower end of an upwardly extending link 65, the upper end of which link, in turn, is pivotally connected with the outer end of a radially outwardly extending arm 66 (FIG. 2) secured on shaft 20. Also secured to shaft 20 is a radially outwardly projecting arm 67, the outer end of which is pivotally connected with the lower end of a piston rod 68, the upper end of which rod 68 slidably extends through a packing gland into a cylinder 69 and carries a piston at its upper end within said cylinder. The upper end of said cylinder is pivotally connected with the pivot 70 pivotally supporting crank 15. Compressed air lines 73, 74 respectively connect with opposite ends of the cylinder 69. Piston 68' is on the upper end of rod 68.

Stationarily supported at the upper end of the apparatus (FIG. 2) is a sensor 75 corresponding in structure to sensor 47, and this sensor is supported in a position for engagement of its ball valve 76 with the arm 9 carried on the upper end of shaft 8, once upon each revolution of shaft 8. A compressed air line 77 connects with the end of sensor 75 opposite to ball 76.

The air lines 49, 77 extend from sensors 47, 75 to opposite ends of a 4-way shuttle valve housing 78, and air lines 73, 74 respectively extend from the upper end and lower end of the air cylinder 69 to said housing 78, while air from a source of compressed air under pressure passes through a conventional lubricator and line 83 to said housing 78. A spool or shuttle valve member 79 within valve housing 78 is in a position closing lines 73, 77 to pressure from air while the air lines 49, 74 are open to pressure, maintaining the piston 68' and valve member 79 in the positions indicated in FIG. 1 until the sensor 48 is actuated to relieve the pressure below piston 68' and valve member 79.

In operation, referring to FIG. 1, piston 68' and valve member 79 are at the upper ends of their strokes. Upon rotation of cam 7 so the follower 6 is at the low side thereof, the blade 2 will move downwardly under the influence of spring 35 to grip the pit 44 between the blades 2, 3, provided the pit is not split, and at approximately the same time the peach grippers 45 will move into gripping relation to the peach halves and will then rotate the peach halves relative to the pit to separate the halves from the pit, if the pit is properly gripped between blades 2, 3.

The movement of blade 2 is insufficient, if the pit is gripper, to cause finger 50 to actuate sensor 47 by upsetting ball 48, in which case the pit will be separated from the peach and upon retraction of the grippers 45 the peach halves will fall onto the receiver 30, which receiver moves under the influence of rotation of shaft 8 to the dot-dash line position 34 and will discharge the pit and peach halves between plates 53, 54 for dropping against the deflector plate 59. The halves and pit will be guided by plate 59 to the right, as viewed in FIG. 3, onto a collector or onto any suitable conveyor 80 for subsequent segregation of the loose pits from the halves.

At the time the halves and pit are discharged from the receiver 30, a new peach is fed to a position between the blades 2, 3 and while the sensor 75 will be actuated immediately after the discharge of the halves and pit from the receiver 30 by reason of the engagement between arm 9 and ball 76, no change in the position of piston 68' or member 79 will occur.

On the other hand, in the event the blade 2 moves through a split pit, the finger 50 will be moved to upset ball 48 of sensor 48 and immediately the air under pressure below piston 68' and member 79 will be relieved and the valve member 79 will move to open the line 79 to movement of air under pressure to lines 73, 77 and the rod 68 will be moved downwardly to cause the deflector plate 59 to be moved to the dotted line position 81. Upon release of the grippers 45, the peach halves with the pit halves therein will fall onto the deflector plate in position 81 and they will be deflected or guided to the left, as viewed in FIG. 1, to a collector or onto a suitable conveyor 82 separate from the properly pitted peach halves.

Immediately after the peach halves have been guided or deflected to the left by the plate 59, the arm 9 driven by shaft 8 will engage the ball of sensor 75 and will release the pressure above piston 68' and valve member 79 to restore the guide or deflector 59 to its position for deflecting pitted peaches to the right, as viewed in FIG. 3.

Insofar as the method itself is concerned, it is one in which the bisecting is done at a single station, and at this single station the pitting of peaches having sound pits is effected and also the complete bisection of peaches having split pits is effected by a peach bisector that is stopped at a point when it engages a sound pit after bisection of the body, but continues movement past said point in the event of a split pit being in the peach and between the halves of the pit. The peach halves are then separated from the sound pits and the halves having split pit halves therein are separated, according to whether the pits are sound or split, and then the halves are simultaneously dropped from said station and the pitted and unpitted halves are separated for movement of the pitted halves into one of a pair of paths below said station, while the unpitted halves are moved into the other path, and in the present method, the continued movement of the peach bisector past the point where it stops when engaging a sound pit is utilized to effect the separation of the pitted from the unpitted halves.

It is to be understood that the specifically described structure herein is not to be construed as a limitation upon the scope of the invention except as may be provided for in the appended claims.

We claim:

1. A method of separating clingstone peaches having sound pits therein from clingstone peaches having split pits at a single bisecting and pitting station comprising the steps of:
   (a) supporting each whole peach substantially stationary at a single peach bisecting and pitting station with the suture of the pit in each pit in a substantially fixed predetermining plane,
   (b) moving a peach bisector in said plane into engagement with the pit which is so supported at said station and stopping movement of said bisector upon its engagement with the pit in said peach in the event said pit is sound with its halves firmly connected along the line of its suture as distinguished from a split pit, and continuing the movement of said bisector between the halves of the pit in the event said pit is split,
   (c) bisecting the body of the peach around said pit substantially in the plane of said suture upon said movement of said bisector; then
   (d) simultaneously separating, at said station, the halves of the bisected body of a peach having a sound pit therein from the latter, and in the event of a peach having a split pit simultaneously separating the halves of the body having the split pit halves therein leaving said pit halves within the halves of the body for dropping from said single station; then
   (e) separating the pitted peach halves from the unpitted peach halves along a different path of travel from said unpitted halves,
   (f) said separation of said pitted halves from the unpitted halves for movement along different paths being under the influence of and controlled by the movement of said bisector different distances according to whether it is stopped by a sound pit or continues its movement between the halves of a split pit.

2. In the method as defined in claim 1;
   (g) each peach being supported at said single station with the suture of its pit substantially in a vertical plane,
   (h) simultaneously gripping each pit at opposite sides of said plane during said bisecting and pitting operation and simultaneously twisting said halves to effect the separation of the halves of the bodies of said peach from a sound pit or separating the body and pit halves in the event of a split pit, and thereafter simultaneously releasing said halves for simultaneously falling by gravity for said movement along said different paths.

3. In a clingstone peach pitter of the type wherein peach bisecting means at a single pitting and bisecting station is movable a first distance in the bisecting operation into stopping engagement with a sound pit held at said station by said means, and is movable a second distance different from said first distance in the bisecting operation and to a position between the halves of a split pit at said station, and which peaches having sound pits are pitted and immediately dropped at said station after bisection while the peach halves having split pits are immediately dropped with the pit halves held in said halves respectively, the improvement comprising:
   (a) guide means adjacent to said station movably supported for guiding peach halves dropped from said station,
   (b) means operable in response to movement of said bisecting means said second distance for moving said guide means from a first position for guiding pitted peach halves dropped from said station into one path, to a second position for guiding the unpitted peach halves dropped from said station into another path, whereby said pitted peach halves will be separated from said unpitted peach halves, and
   (c) means for returning said guide means from said second position to said first position substantially immediately after said movement to said second position and prior to dropping the halves of another peach from said station.

4. In a peach pitter as defined in claim 3;
   (d) said bisecting means including a bisecting blade having pit-gripping means adapted to engage a sound pit within a whole clingstone peach for holding said pit during separation of the halves of the body of the peach around said pit therefrom, and to engage and pass between the halves of a split pit,
   (e) means supporting said blade for generally reciprocable movement into and out of peach bisecting and pit engaging relation,
   (f) said means operable in response to movement of said bisecting means including a deflecting plate supported below said station in a position for intercepting peach halves bisected by said blade and dropped from said station, and (g) means operably connecting said plate with said blade for movement of said plate to deflect the pitted peach halves of peaches having sound pits from the unpitted halves having split pits therein along different paths.

5. In a peach pitter as defined in claim 3;

(d) said means for returning said guide means from said second position to said first position being automatically operable for so returning said guide means substantially after the bisection of each peach having a split pit therein.

6. In a peach pitter as defined in claim 3;

(d) said means operable in response to movement of said bisecting means including a fluid pressure actuable system having a member reciprocable under alternate admission and release of fluid under pressure against opposite sides thereof operably connected with said guide means for moving the latter between said first and second positions, and (e) a control means in said system operably connected with said bisecting means for said alternate admission and release of said fluid under pressure to one side or the other of said member according to the distance said bisecting means is moved in a bisecting operation.

7. In a peach pitter as defined in claim 6.

(f) said means for returning said guide means from said second position position to said first position being a pressure release element in said system operably connected with said bisecting means.

8. In a peach pitter as defined in claim 4;

(h) said guide means including a generally horizontally disposed receiver below said bisecting means and above said deflecting plate supported for movement from a position initially receiving peach halves dropped from said bisecting means to a discharge position for discharging the halves so received onto said deflecting plate when the latter is in a position for deflecting said peach halves onto one path or the other, (i) power actuated means connected with said bisecting means for actuating the latter, and also connected with said receiver for actuating said receiver after each bisecting movement of said bisecting means.

References Cited

UNITED STATES PATENTS

| | | | |
|---|---|---|---|
| 2,826,227 | 3/1958 | Perrelli et al. | 146—28 |
| 3,040,795 | 6/1962 | Hait | 146—28 X |
| 3,319,784 | 5/1967 | Granger | 209—79 X |

W. GRAYDON ABERCROMBIE, Primary Examiner.

U.S. Cl. X.R.

146—28, 238; 209—79